United States Patent
Sato et al.

(10) Patent No.: US 11,478,934 B2
(45) Date of Patent: Oct. 25, 2022

(54) METHOD AND APPARATUS FOR CONTROLLING ROBOT

(71) Applicant: DENSO WAVE INCORPORATED, Aichi-pref. (JP)

(72) Inventors: Masanori Sato, Chita-gun (JP); Yuto Kawachi, Chita-gun (JP)

(73) Assignee: DENSO WAVE INCORPORATED, Aichi-pref. (JP)

(*) Notice: Subject to any disclaimer, the term of this patent is extended or adjusted under 35 U.S.C. 154(b) by 194 days.

(21) Appl. No.: 16/576,446

(22) Filed: Sep. 19, 2019

(65) Prior Publication Data

US 2020/0086488 A1 Mar. 19, 2020

(30) Foreign Application Priority Data

Sep. 19, 2018 (JP) .............................. JP2018-174916

(51) Int. Cl.
*B25J 9/16* (2006.01)
*B25J 13/08* (2006.01)

(52) U.S. Cl.
CPC ............ *B25J 9/1674* (2013.01); *B25J 9/1653* (2013.01); *B25J 13/085* (2013.01); *B25J 9/1664* (2013.01)

(58) Field of Classification Search
CPC ...... B25J 9/1674; B25J 13/085; B25J 9/1653; B25J 19/063; B25J 9/0081; B25J 9/1612; B25J 9/1628; B25J 9/1664; B25J 13/00; B25J 9/1633; B25J 9/1692; G05B 19/427
See application file for complete search history.

(56) References Cited

U.S. PATENT DOCUMENTS

| | | | | |
|---|---|---|---|---|
| 2010/0274390 A1* | 10/2010 | Walser | .................. | B25J 9/1697 700/259 |
| 2011/0118875 A1* | 5/2011 | Hosek | ................ | G05B 19/4189 700/250 |
| 2011/0319714 A1* | 12/2011 | Roelle | .................. | A61B 1/0016 600/118 |
| 2012/0048027 A1* | 3/2012 | Hashiguchi | ............ | B25J 13/085 73/763 |
| 2017/0151027 A1* | 6/2017 | Walker | .................... | A61B 34/30 |
| 2017/0274532 A1* | 9/2017 | Nishitani | ................ | G06F 30/17 |
| 2018/0032049 A1* | 2/2018 | Inazumi | ............ | G05B 19/0426 |
| 2018/0099422 A1 | 4/2018 | Yoon | | |
| 2019/0001490 A1* | 1/2019 | Washizu | ................ | B25J 9/1651 |

* cited by examiner

*Primary Examiner* — Abby Y Lin
*Assistant Examiner* — Dylan M Katz
(74) *Attorney, Agent, or Firm* — Oliff PLC

(57) ABSTRACT

There is provided a method and an apparatus for controlling a robot arm. In this control scheme, a position error indicating a deviation between a command position, which is a control target position, and a current position, which is a position where the arm of the robot is currently located, is acquired. When the acquired position error exceeds a threshold, a new corrected command position between the current position and the command position is set. After the arm of the robot is moved to the corrected command position, a new corrected command position reset between the corrected command position serving as a new current position and the command position. Reconfiguration of a corrected command position is iterated until a current position of the robot arm becomes equal to the command position so that movement of the robot arm is achieved from the current position to the command position.

15 Claims, 9 Drawing Sheets

FIG.1
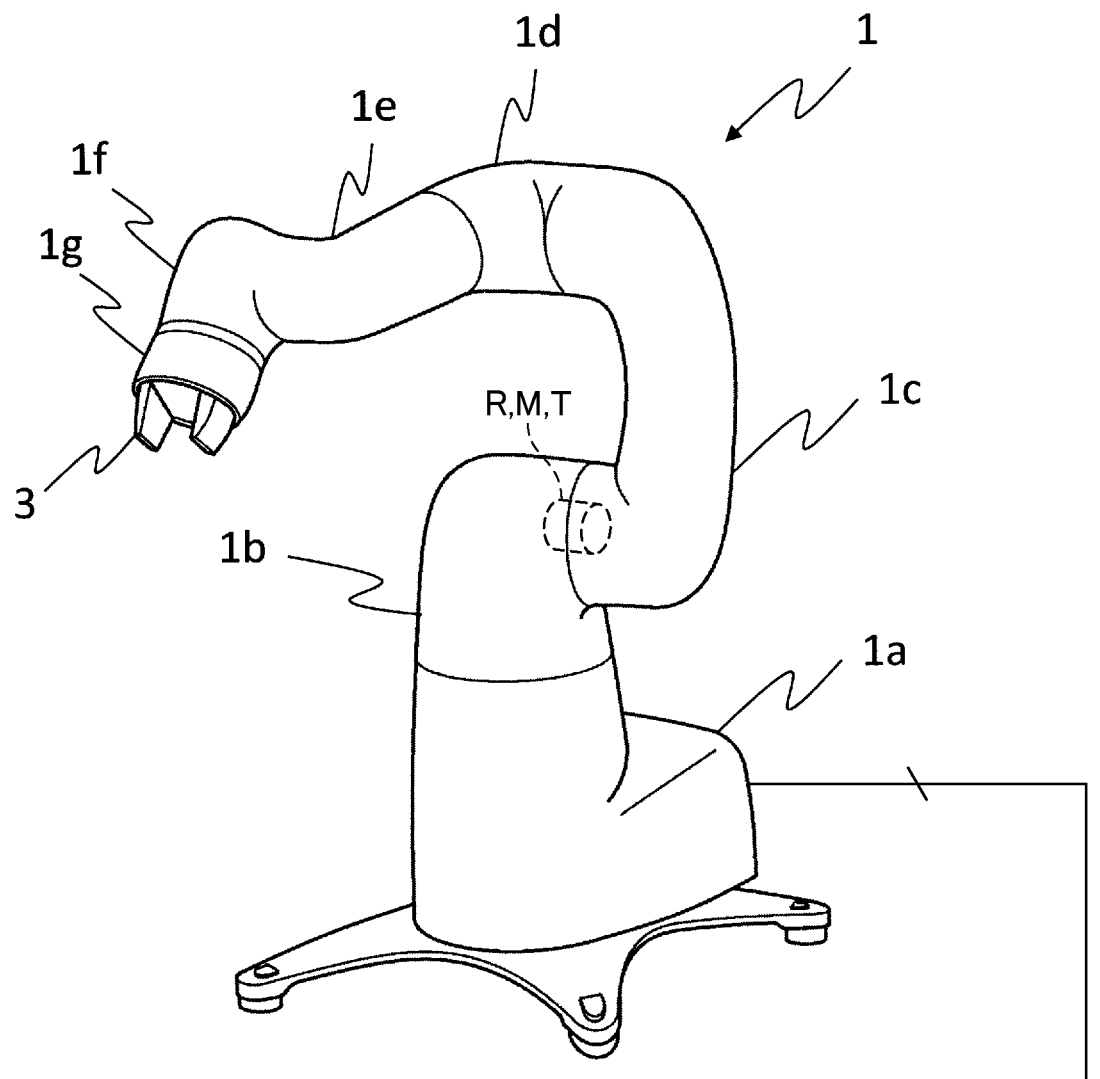
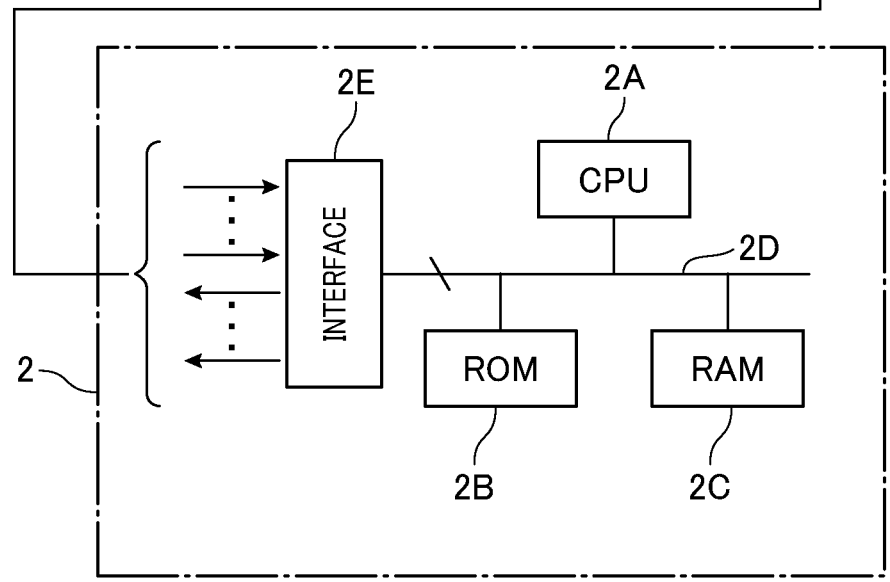

FIG.2
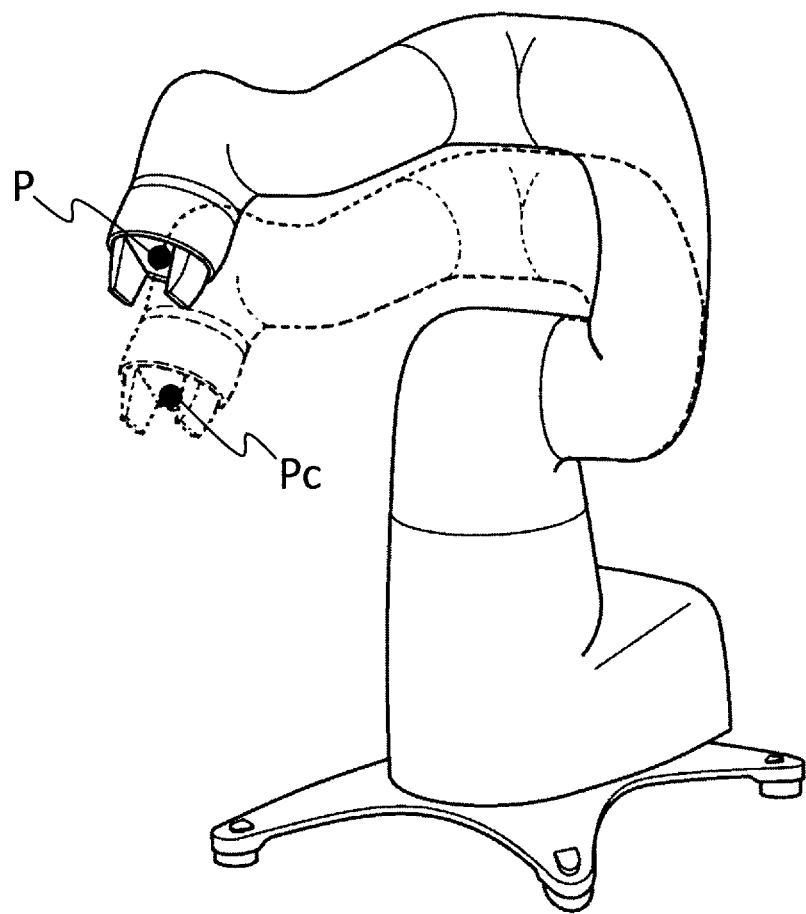
FIG.3
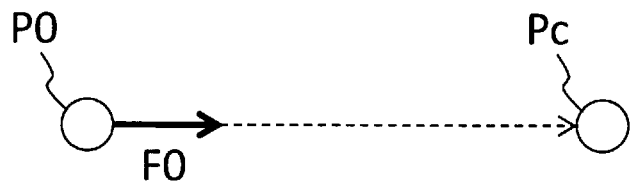

FIG.5
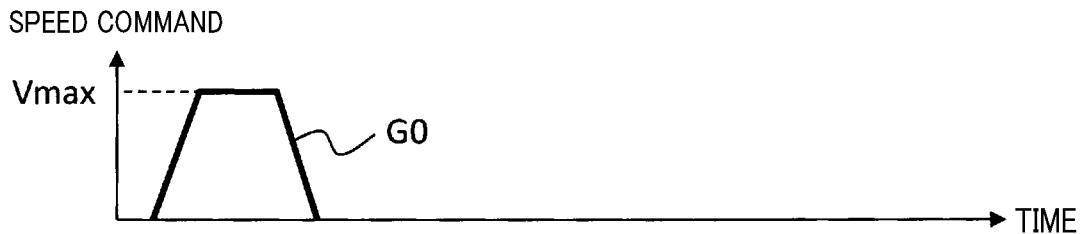
STATE OF AUTOMATIC MODE
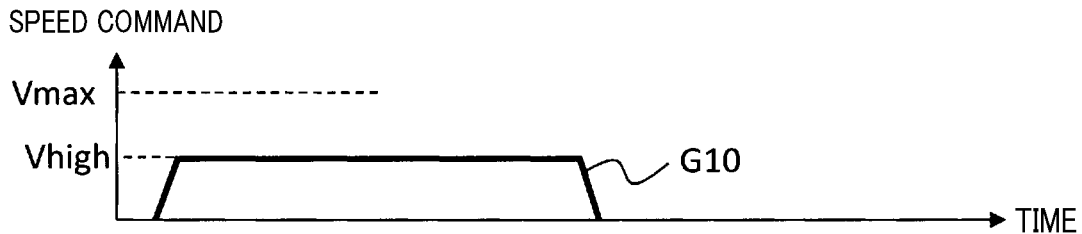
CONSTANT SPEED RETURN
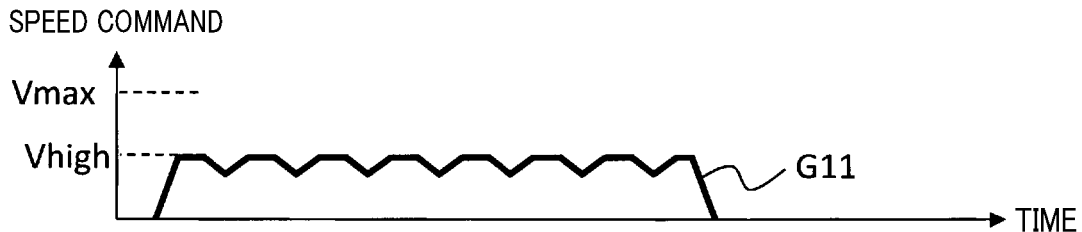
RELIEF RETURN NO.1
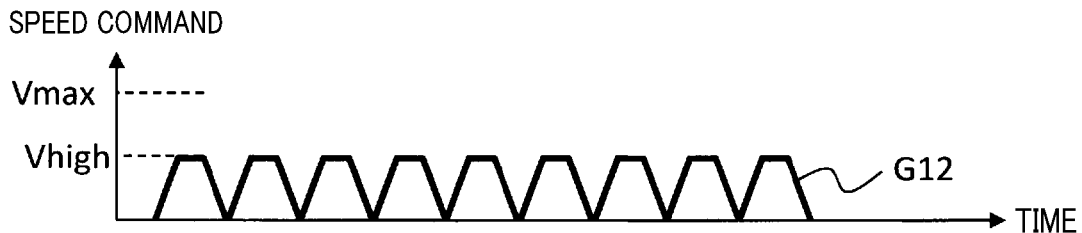
RELIEF RETURN NO.2
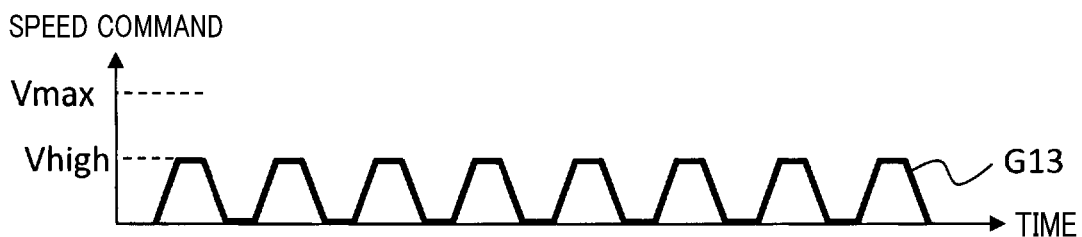
RELIEF RETURN NO.3

FIG.6
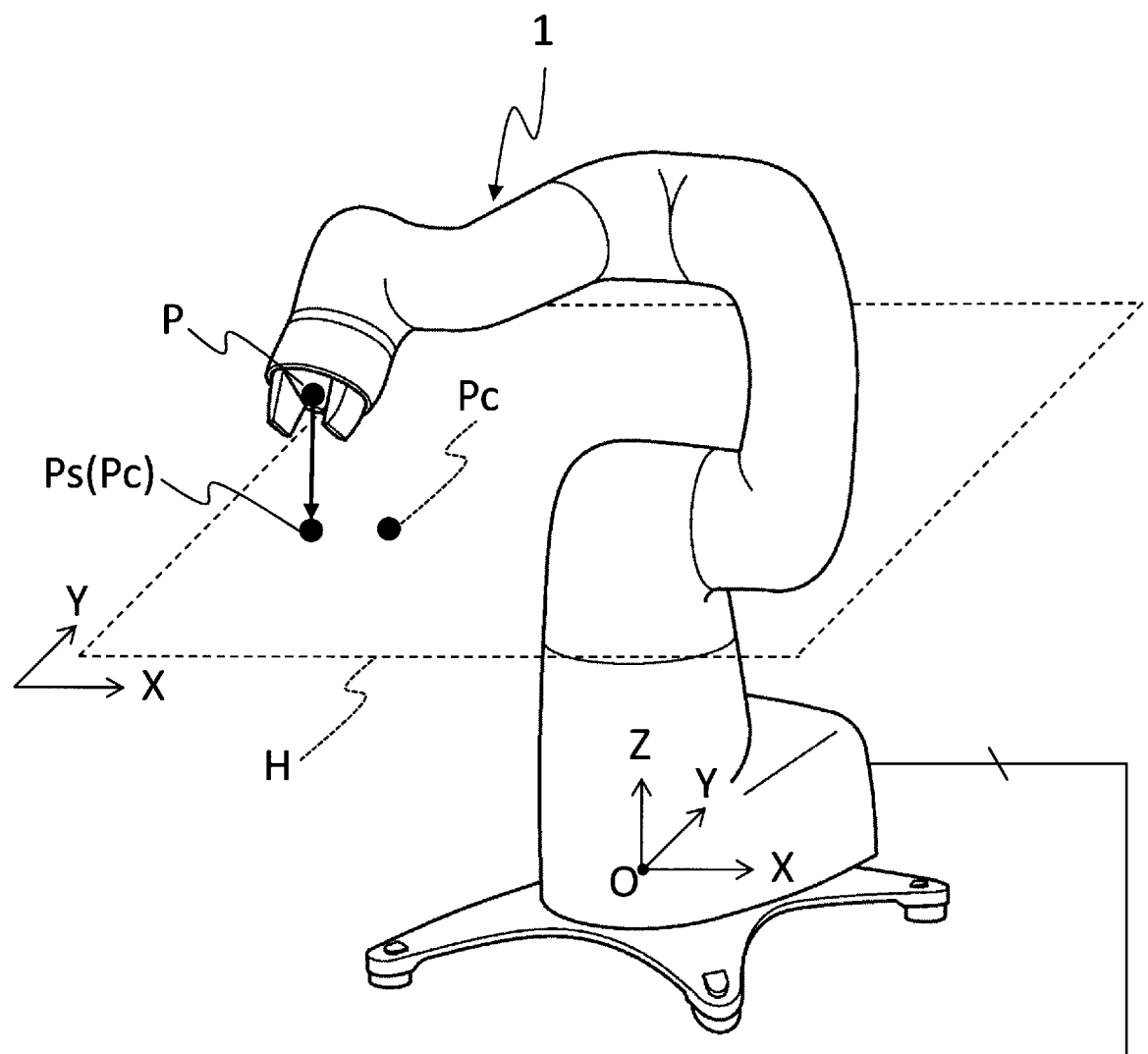
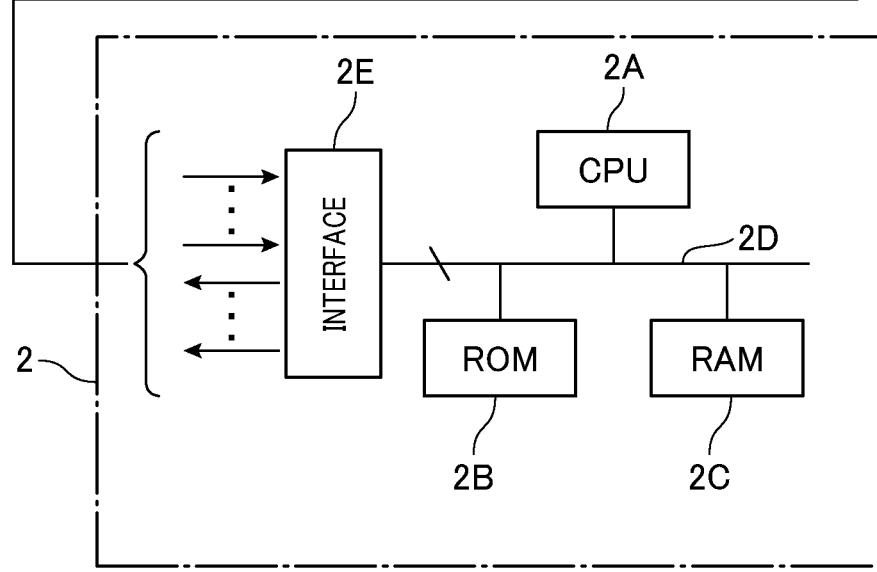

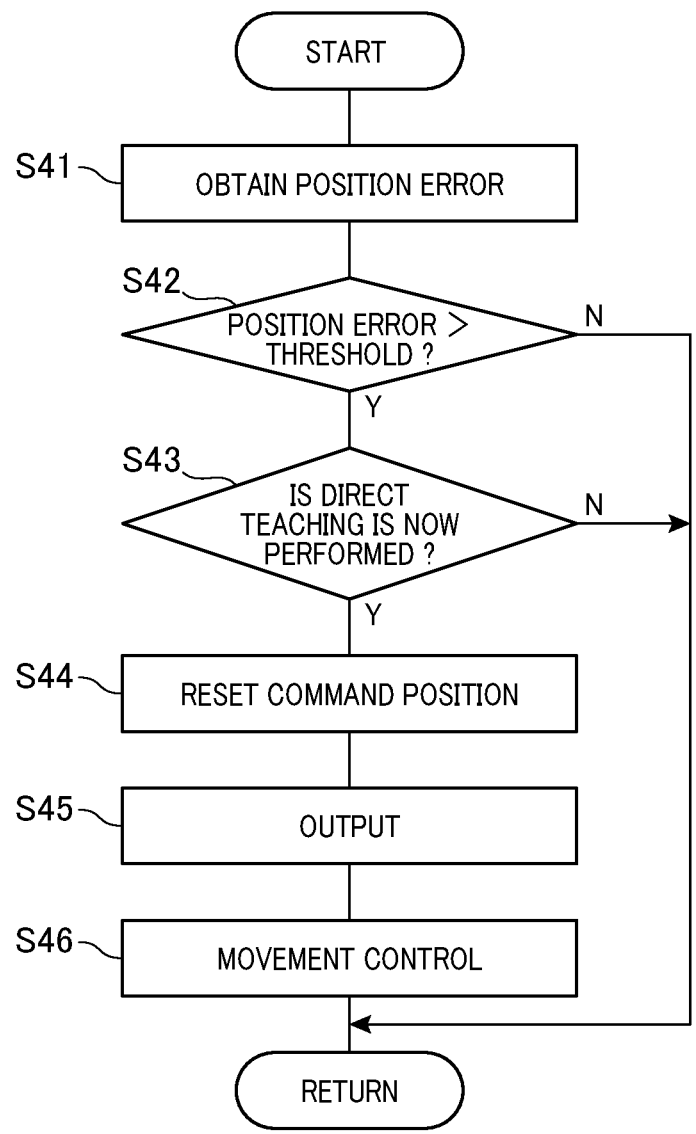

METHOD AND APPARATUS FOR CONTROLLING ROBOT

CROSS-REFERENCE TO RELATED APPLICATION

This application is based on and claims the benefit of priority from earlier Japanese Patent Application No. 2018-174916 filed Sept. 19, 2018, the description of which is incorporated herein by reference.

BACKGROUND

Technical Field

The present disclosure relates to a method and apparatus for controlling robots, and in particular, to the method and apparatus for controlling industrial robots.

Related Art

Industrial robots, when they have contacted an obstacle or received an external force while being subject to position control, may have a position error that is a state in which a command position and a current position are deviated from each other. In the occurrence of a position error, industrial robots based on the conventional art may seek to return to the command position. However, if the position error is large, a speed command, for example, may diverge, i.e. may reach an upper limit, and the posture of the robot may change abruptly. As a measure against this, in general, industrial robots are provided with a malfunction detection function which is activated so that a position error exceeding a predetermined threshold is determined to be a malfunction and the robot in question is deactivated (e.g., see JP 2017-7023 A).

[PTL 1] JP 2017-7023 A

Robots in recent years are not necessarily enclosed by a safety fence so that they can serve as collaborative robots which are capable of working with operators, cooperating with them.

Based on an idea of intrinsic safety, collaborative robots are designed such that the generated torque will be smaller, in principle, than in the industrial robots based on the conventional art. Therefore, collaborative robots, when an external force is applied thereto by being brought into contact with an unforeseen obstacle or by being accidentally brought into contact with an operator, cannot generate torque sufficient for resisting against the external force and thus have a high probability of having a larger position error than do the industrial robots based on the conventional art.

Furthermore, such a collaborative robot, when subject to direct teaching by an operator directly contacting it, detects an external force using a force sensor or a torque sensor and updates and outputs a command position in a direction conforming to the external force, with the position control remaining activated. However, since the robot's posture may further be changed by an operator before the external force is converted to a position command and outputted, a large position error may be likely to occur. In this case, the malfunction detection function may be deactivated, or the threshold may be increased so that no malfunction determination would be made.

However, deactivation of the malfunction detection function is impractical because the deactivation may impair safety. If the threshold is increased as an alternative, the speed command may diverge as mentioned above. In this case, the collaborative robot may abruptly move in the vicinity of an operator, for example, at the moment when the operator releases his/her hold on the robot during direct teaching without noticing the occurrence of a position error, or at the moment when the operator accidentally contacts the robot during normal tasks. Therefore, safety may again be impaired.

SUMMARY

It is thus desired to provide a method and an apparatus for controlling a robot with which safety can be ensured more reliably even in the occurrence of a position error.

According to a first mode of the present disclosure, a method of controlling a robot includes: acquiring a position error indicating a deviation between a command position that is a control target position of the robot and a current position that is a position where the robot is currently located, in an operating space of the robot; when the acquired position error exceeds a threshold set in advance, setting a new corrected command position between the current position and the command position; after the robot is moved to the corrected command position, resetting a new corrected command position, between the corrected command position as a new current position and the command position; and iterating reconfiguration of a corrected command position until a current position becomes equal to the command position to achieve movement from the current position to the command position.

The reason why safety is a concern when the robot returns to the command position is that, as mentioned above, a speed command or the like may diverge and allow the robot to abruptly start moving. Therefore, if the robot is prevented from abruptly moving, safety is unlikely to be impaired.

In this regard, the present disclosure uses a control method in which a corrected command position is set between a current position and a command position so that the robot can move from the current position to the corrected command position. This setting and movement processing is iterated to move the robot to the command position. Thus, since the distance of movement in one iteration of the processing becomes smaller, i.e. the position error is reduced, the speed command or the like is prevented from greatly varying and an abrupt speed change or the like is unlikely to occur. Accordingly, safety is ensured more reliably in the occurrence of a position error.

According to a second mode, the method includes: calculating a maximum value of a moving speed as a maximum speed, the maximum value being assumed to ensure safety more reliably, and setting the threshold by multiplying the maximum speed by an update cycle of the command position; and setting the corrected command position at a position apart from the current position by a distance corresponding to the threshold.

Thus, since the corrected command position is set at a position ensuring safety in advance, safety is ensured more reliably in the occurrence of a position error. In this case, the threshold is the maximum value of the distance that is considered to ensure safety more reliably. Thus, by setting the corrected command position at a position apart from the current position by a distance corresponding to the threshold, return to the initial command position can be achieved by a minimum number of iterations of the movement. Consequently, productivity or workability is unlikely to be impaired.

According to a third mode of the present disclosure, a method of controlling a robot includes: acquiring a position error indicating a deviation between a command position that is a control target position and a current position that is a position where the robot is currently located; when the acquired position error exceeds a threshold set in advance, producing a new speed pattern in which an upper limit of a speed command for moving the robot from the current position to the command position is made smaller than a maximum value of a speed command which is based on an assumption of moving the robot from the current position to the command position by position control; and moving the robot from the current position to the command position based on the produced new speed pattern.

When a robot is moved from a current position to a command position by normal position control, the movement is attempted to be performed in a shortest time. Thus, a speed pattern in which a speed command has a maximum allowable value is produced. In this case, the speed command or the like may diverge as mentioned above and the robot may move abruptly, impairing safety.

In this regard, in the present disclosure, a new speed pattern in which an upper limit of the speed command at the time of movement is made smaller than a maximum allowable value is produced. The robot may be moved from a current position to a command position according to the newly produced speed pattern. Thus, the speed command or the like is prevented from greatly varying, and safety is ensured more reliably when the robot is moved from the current position to the command position in the occurrence of a position error.

According to a fourth mode of the present disclosure, a method of controlling a robot includes: acquiring a position error indicating a deviation between a command position that is a control target position and a current position that is a position where the arm of the robot is currently located; when the acquired position error exceeds a threshold set in advance and the robot is being subject to direct teaching in which a constraint plane is set to constrain a movement direction, resetting a new command position that is a projection of the current position onto the constraint plane; and moving the robot from the current position to the new command position.

Direct teaching is performed by an operator directly changing the posture of a robot. In this case, for example, if an operator attempts to move the robot's arm along a straight line, a slight deviation may occur. The deviation may occur not only in the horizontal direction but also in the vertical direction. Therefore, assuming the occurrence of the deviation mentioned above, a movement direction in direct teaching may be constrained, for example, within a predetermined plane. The plane constraining a movement direction is termed a constraint plane hereinafter.

However, a collaborative robot, which cannot generate torque sufficient for resisting against the force of an operator, may be moved away from the constraint plane, if any. In direct teaching, the robot is manipulated by an operator. Considering this, even if a position error has occurred, the robot does not have to be moved to the initial command position because the position error is considered to have been deliberately caused by the operator.

In this regard, when a position error has occurred and the robot is being subject to direct teaching, the current position is projected onto the constraint plane and the projected position is reset as a new command position, so that the robot can be moved from the current position to the reset command position. The fact that a constraint plane has been set means that the operator desires to set a current position in the constraint plane. Therefore, by using a position projected to the constraint plane as a new command position, the robot may be moved conforming to the operator's intention, thereby preventing useless movement of the robot.

According to a fifth mode of the present disclosure, in the foregoing control manner, the robot is moved at a constant speed. In this case, an abrupt speed change or the like is prevented and thus safety is ensured more reliably.

According to a sixth mode of the present disclosure, the robot is moved with a speed being varied. In this case, since the occurrence of an abrupt speed change or the like is reduced or prevented, safety is ensured more reliably. Also, for example, if the robot moves at the time when an operator releases his/her hold on the robot during direct teaching, the robot may be unavoidably suspected of having a malfunction. However, by varying the moving speed, return to the command position can be visually or tactually indicated.

According to a seventh mode of the present disclosure, the robot is moved by being provided with a position or a zone where a moving speed is reduced to zero. In this case, since an abrupt speed change or the like is prevented, safety can be ensured more reliably. Also, for example, if the robot arm moves at the time when an operator releases his/her hold on the robot during direct teaching, the robot may be unavoidably suspected of having a malfunction. However, by varying the moving speed, return to the command position can be visually or tactually indicated more reliably. In this case, for example, the moving speed does not have to be reduced to zero but may be varied greatly within a range, for example, that is 10% or less of an assumed maximum value so that the operator can visually keep track of the robot. The same applies to the case where a zone is set.

In the present disclosure, there are also provided apparatuses for controlling industrial robots, which have configurations functionally equivalent to the control methods according to the foregoing first, third and fourth modes.

BRIEF DESCRIPTION OF THE DRAWINGS

In the accompanying drawings:

FIG. 1 is a schematic diagram illustrating a configuration of a robot according to a first embodiment of the present disclosure;

FIG. 2 is a schematic diagram illustrating an example of a state in which a position error has occurred;

FIG. 3 is a set of diagrams illustrating the mechanism of occurring a position error;

FIG. 5 is a set of schematic diagrams illustrating examples of speed patterns to be produced;

FIG. 6 is a schematic diagram illustrating a configuration of a robot according to a second embodiment of the present disclosure;

FIG. 10 is a further flowchart outlining moving control of the robot arm position according to the foregoing embodiments and modifications thereof.

DETAILED DESCRIPTION OF THE PREFERRED EMBODIMENTS

Figure 4:
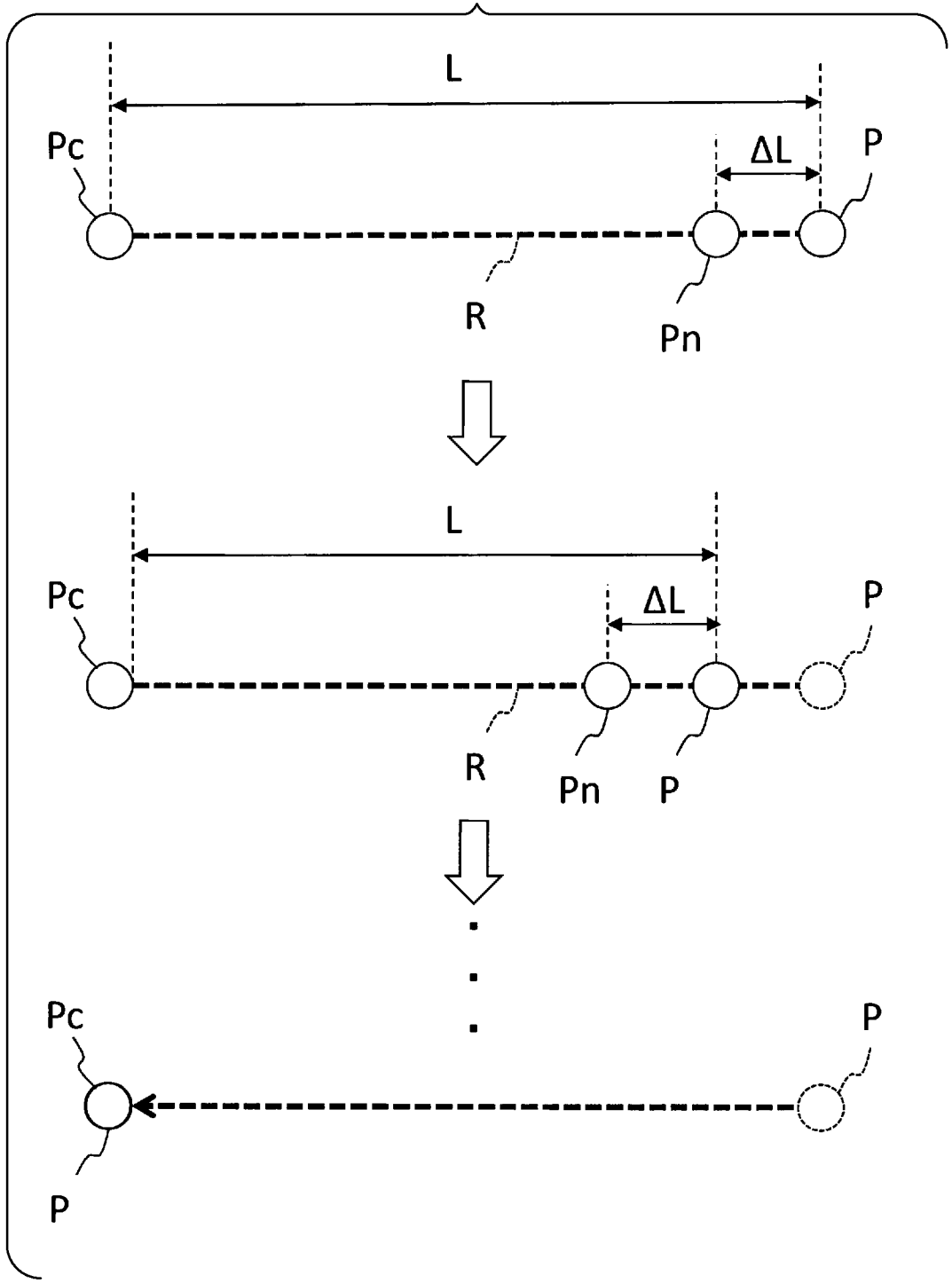
FIG. 4 is a set of schematic diagrams illustrating a mode of setting a corrected command position.

With reference to the accompanying drawings, some embodiments of the present disclosure will be described. It should be noted that the components common among the embodiments are given the same reference numerals for the sake of omitting redundant explanation.

First Embodiment and Modifications

With reference to FIGS. 1-5 and 7-9, a first embodiment and modifications thereof will now be described.

FIG. 1 is a schematic diagram illustrating a configuration of an industrial robot 1 as a collaborative robot according to a first embodiment of the present disclosure.

As shown in FIG. 1, the industrial robot 1 of the present embodiment is a six-axis vertical articulated robot which is controlled by a controller 2. The robot 1 includes a base 1a, a shoulder b1, a lower arm 1c, a first upper arm 1d, a second upper arm 1e, a wrist 1f and a flange 1g. The shoulder 1b is connected onto the base 1a via a first axis (i.e., referred to as a joint J1 (not shown)). The lower arm c1 is connected to the shoulder 1b via a second axis (i.e., referred to as a joint J2 (not shown)). The first upper arm d1 is connected to the lower arm 1c via a third axis (i.e., referred to as a joint J3 (not shown)). The second upper arm 1e is connected to the first upper arm 1d via a fourth axis (i.e., referred to as a joint J4 (not shown)). The wrist 1f is connected to the second upper arm 2e via a fifth axis (i.e., referred to as a joint J5 (not shown)) being offset therefrom. The flange 1g is connected to the wrist 1f via a sixth axis (i.e., referred to as a joint J6 (not shown)). It should be noted that the configuration shown in FIG. 1 is only example. The robot 1 may be, for example, a seven-axis robot or may be a six-axis robot having a wrist 1f that is not offset.

In the following description according to the present embodiment and modifications thereof, the center of the flange 1g is termed a center position, the center position of the robot 1 in the current posture is termed a current position (P) in an operating space of the robot 1, and a control target position of the robot 1, i.e. the center position when the robot 1 is subject to position control, is termed a command position (Pc). Furthermore, the state in which the center position or the orientation of the flange 1g changes when the posture of the robot 1 changes is simply termed movement. The operating space is a three-dimensional space in which the arm of the robot 1 is moved when the robot 1 performs a specified task.

The robot 1 has a hand 3 which is mounted to the flange 1g and used for tasks. The hand 3 is operated by the controller 2, with the posture being controlled. In this case, as is well known, the controller 2 controls the robot 1 into an arbitrary posture by driving and rotating electric motors M provided to the respective joints of the arm of the robot 1.

The controller 2 is configured to cause a force sensor R, a torque sensor T, or the like, provided at the respective joints of the arm of the robot 1 to detect an external force applied to the arm of the robot 1 such as when the robot 1 is subject to direct teaching. Although not shown, at each of the joints of the robot arm, rotation sensors detecting rotation angles of each joint are arranged. Signals detected by the rotation sensors are also fed to the controller 2 for controlling the robot arm. In the direct teaching, the posture of the robot 1 is changed by an operator directly coming into contact with the arm or the like of the robot 1 to teach task positions thereto (i.e., direct teach or direct teaching). At the time of direct teaching, the controller 2 updates and outputs a command position (Pc) conforming to the direction in which an external force has been applied, with position control remaining activated, to thereby control the posture of the robot 1, i.e. the center position and the orientation of the flange 1g.

By way of example, the controller 2 is provided as a computer system configured to sequentially execute steps of preset control programs including position control programs for positional deviation according to the present disclosure. A practical example shown in FIG. 1, in which the controller 2 is provided with a central processing unit (CPU) 2A, a read-only memory (ROM) 2B, and a random access memory (RAM) 2C, which are communicably connected between the CPU 2A and the other components via an internal bus 2D. The internal bus 2D is also connected to an interface 2E to communicate with the various sensors and motor drivers for the motors of the robot. The CPU 2A is thus able to function as control means, while the ROM 2B functions as a non-transitory computer-readable recording medium in which source codes of steps of the preset control programs are previously stored. The CPU 2A reads the programs from the ROM 2B and stores the read programs in a specified work area for execution thereof. RAM 2C is able to temporarily store data generated or needed during the execution of the programs by the CPU 2A. The foregoing computer configuration is just an example, and other configurations can be adopted as long as the preset computer programs can be performed. For instance, two or more CPUs can be used for decentralized control or redundant system. In addition, the CPU 2A is provided as an essential calculation component of the computer system, so that different types of calculation components can be used provided that such calculation components have equivalent calculational functions to the CPU 2A.

The controller 2 also executes a process of cancelling a position error, i.e. a deviation between a command position (Pc) and a current position (P), if any.

This process will be specifically described later. In the following description, advantageous effects of the configuration described above will be explained.

As described above, torque that can be generated in the robot 1 is relatively smaller. Therefore, even when the robot 1 is under position control, application of an external force by an operator contacting the robot 1 by hand attempting to move the robot's arm may change the posture of the robot 1. Thus, the small torque of the robot 1 ensures safety more reliably if the robot 1 should come into contact with an operator, and easily enables direct teaching. However, as shown in FIG. 2, the small torque of the robot 1 may easily allow occurrence of a position error, i.e. a deviation, between a command position (Pc) and a current position (P).

Specifically, a command position (Pc) may be deviated from a current position (P) if an operator accidently contacts the robot 1 or if a tool or the like held in an operator's hand contacts the robot 1.

Moreover, as shown in FIG. 3, a command position (Pc) set by position control during direct teaching may be deviated from a current position (P). Specifically, during direct teaching, the controller 2 detects a force (F0) applied to the robot 1 at an initial position (P0). Then, as shown in FIG. 3, the controller 2 sets a command position (Pc) in a direction conforming to and suitable for the applied external force to change the posture of the robot 1 in conformity with the external force. Then, the controller 2 outputs a position command, such as a speed command, to move the robot 1 from the initial position (P0) to the command position (Pc).

In this case, the robot 1 is moving due to the force applied by an operator, and the operator may further move the robot 1 before a position command suitable for the detected external force (F0) is outputted by the controller 2 or during the period from the output of the position command to the time point when the robot 1 reaches a target position, i.e. a command position (Pc). Consequently, the current position (P) may step across the command position (Pc).

When the robot 1 is moved by hand by an operator, there is a high probability that the movement line is slightly curved, although the operator has intended to move the robot along a straight line. Specifically, the robot 1 may be oriented differently at the initial position (P0) from the application direction of the initial external force (F0), resulting in a deviation between the command position (Pc) and the current position (P). Furthermore, when an operator applies a force to the robot 1 attempting to move it and then reduces the force, a command position may be set at a position further forward than a desired position, allowing the robot 1 to advance further than the position where movement by hand has been stopped.

In this way, the robot 1 as a collaborative robot is configured to easily cause a large position error. If a position error has occurred, the controller 2 may move the robot 1 from the current position (P) to the command position (Pc) to correctly locate the robot 1 at the command position (Pc).

In this case, if the position error is large, the speed command, for example, may diverge to abruptly change the posture of the robot 1 as described above. As a result, the operator supposed to be present near the robot 1 may be exposed to risk. For this reason, a malfunction detection function is activated in the conventional art so that a large position error, if it occurs, is determined to be a malfunction to thereby deactivate the robot.

However, if the malfunction detection function is activated during direct teaching in which a position error may easily occur, the robot 1 may be deactivated and the teaching operation may be greatly delayed. If the malfunction detection function is deactivated as an alternative, safety will not be ensured more reliably. If the threshold is increased as a further alternative to avoid a malfunction determination, the speed command may diverge as mentioned above and safety may again be impaired. During direct teaching in particular, the operator contacting the robot 1 will not notice the occurrence of a position error and may continue the teaching operation. Then, at the moment when the operator releases his/her hold on the robot 1 during such direct teaching, the robot 1 may abruptly move.

In this regard, in the present embodiment, some control methods are used to ensure safety more reliably in the occurrence of a position error. These control methods will be described below. These control methods are performed by the controller 2 (practically, the CPU 2A) executing control programs including programs outlined in FIGS. 7 to 10 each of which is carried out repeatedly at minute intervals $\Delta t$. In addition, the term "move" or "movement" of the robot 1 is intended to mean "move" or "movement" of the arm of the robot 1.

Control Method for Resetting a Command Position

First, a control method for resetting a command position will be described. FIG. 4 shows a state in which a position error (deviation) has occurred between a current position (P) and a command position (Pc), or more precisely, shows a state in which a distance (L) between a current position (P) and a command position (Pc) has exceeded a predetermined threshold ($\Delta L$).

Figure 7:
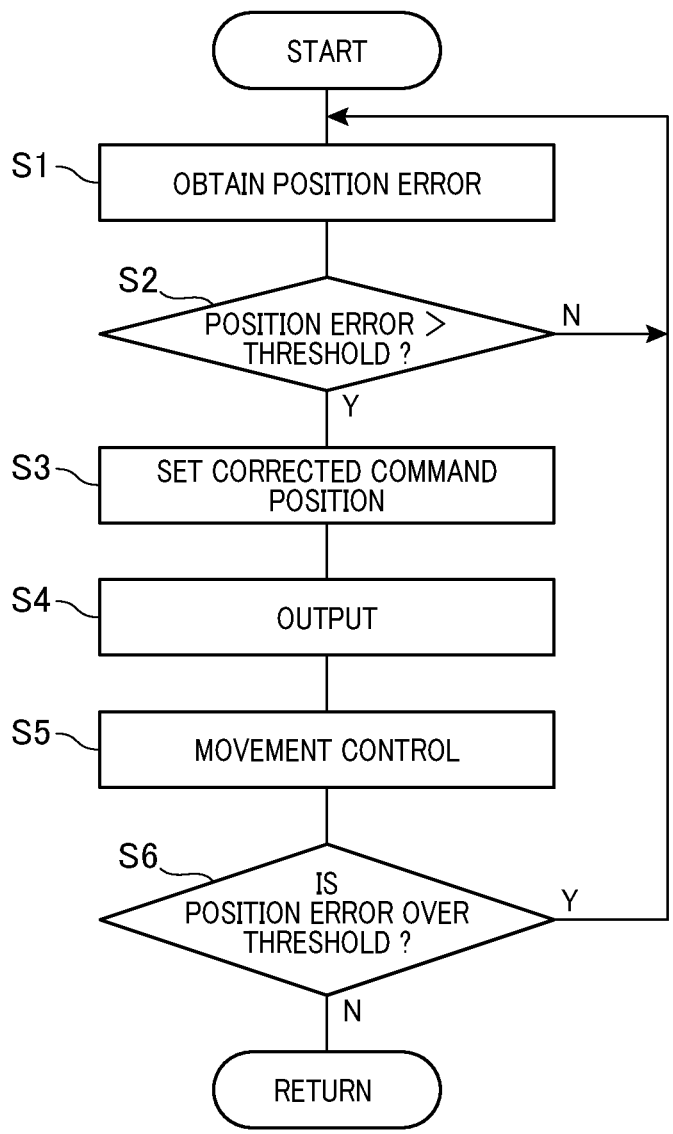
FIG. 7 is a flowchart outlining moving control of the robot arm position according to the foregoing embodiments and modifications thereof.
Figure 8:
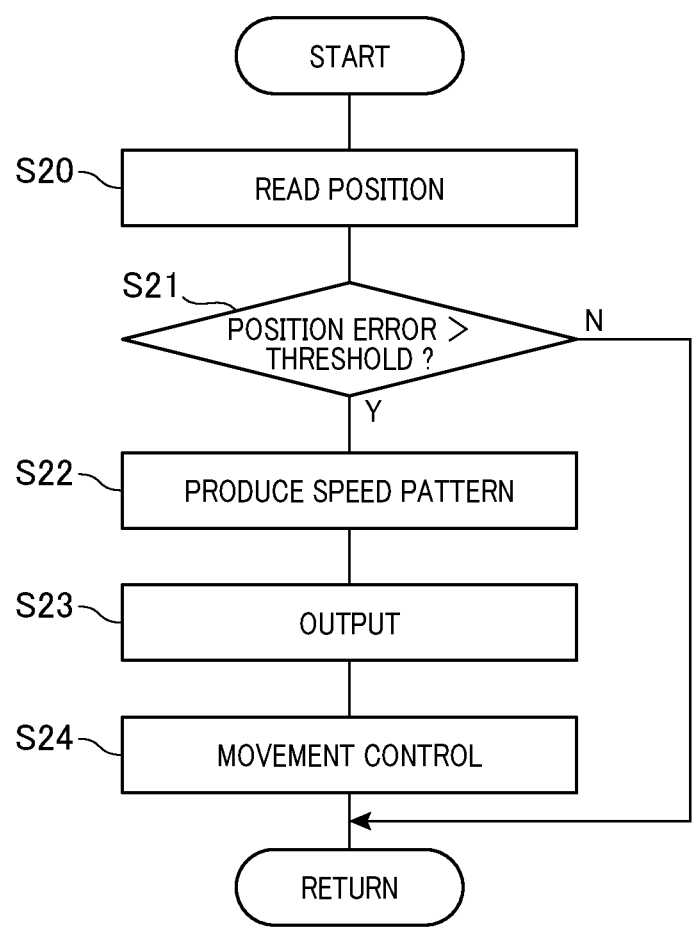
FIG. 8 is a further flowchart outlining moving control of the robot arm position according to the foregoing embodiments and modifications thereof.
Figure 9:
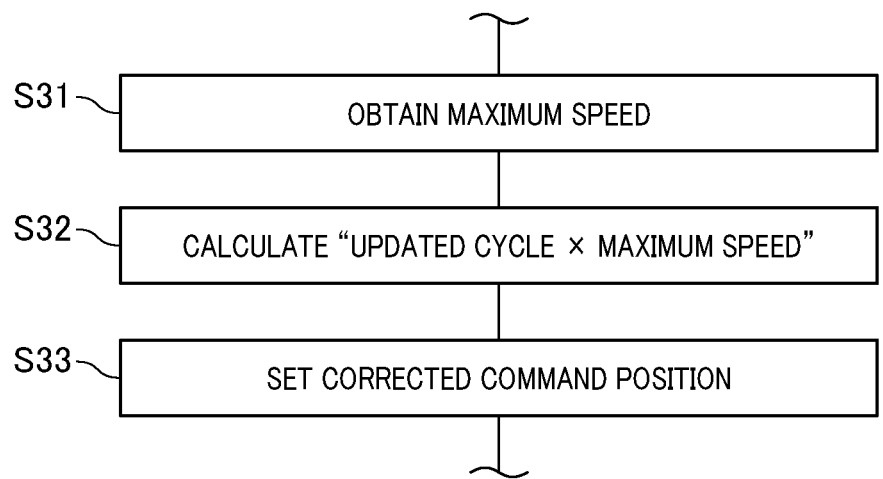
FIG. 9 is a further flowchart outlining moving control of the robot arm position according to the foregoing embodiments and modifications thereof.

In the robot 1, the controller 2 (CPU 2A) obtains a position error showing a deviation between the current position (P) of the arm and a command position (i.e., a commanded position of the arm) (Pc) (FIG. 7, step S1). Then the controller 2 determines whether there is such a position error between the current position (P) and the command position (Pc) (step S2). If the occurrence of such a position error is determined (step S2, YES), the controller 2 sets a new command position (termed corrected command position (Pn) hereinafter) between the current position (P) and the command position (Pc). The corrected command position (Pn) is set at a position apart from the current position (P) by a distance corresponding to the threshold ($\Delta L$), on a path (R) extending from the current position (P) to the command position (Pc) (step S3).

In this case, the threshold ($\Delta L$) is set as a corrected command position, based on a possible maximum moving speed. Specifically, based on the size, shape and mechanical elements of the robot 1 or tasks to be performed by the robot 1, a maximum moving speed (termed maximum speed hereinafter) which is considered to ensure safety is set before starting operation of the robot 1. Then, the set maximum speed is multiplied by the update cycle, i.e. the control cycle, of the command position (Pc) to obtain a distance from the current position (P), through which the robot 1 can be moved during the update cycle with safety being ensured more reliably. The resultant distance is set as a threshold ($\Delta L$).

Specifically, the controller 2 of the robot 1 sets a maximum distance, which is considered to ensure safety, as a threshold ($\Delta L$) in advance. If the position error exceeds the threshold ($\Delta L$), the controller 2 determines that safety may be impaired during movement from the current position (P) to the command position (Pc), and sets and outputs a position that is apart from the current position (P) by a maximum distance, i.e. by the threshold ($\Delta L$), ensuring safety, as a corrected command position (Pn), i.e. as a new command position (step S4).

Then, when a position command to move from the current position (P) to the corrected command position (Pn) is produced and outputted from the controller 2, the arm of the robot 1 moves to the corrected command position (Pn) in a state in which safety is ensured (step S5). The corrected command position (Pn) after movement then serves as a current position (P). Thus, the controller 2 again determines whether the position error between this new current position (P) and the previous command position (Pc) exceeds the threshold ($\Delta L$). If the position error exceeds the threshold ($\Delta L$), the controller 2 again sets a corrected command position (Pn) (step S6). Iterating this processing, the arm of the robot 1 moves to the initial command position (Pc).

Thus, even when a position error has occurred between the current position (P) and the command position (Pc), the arm of the robot 1 can move to the command position (Pc) in a state in which safety is ensured. In this case, since the position error becomes smaller in one iteration of the processing of movement, the speed command or the like is prevented from greatly varying and thus abrupt speed change or the like is prevented or reduced. Furthermore, since a corrected command position (Pn) is set at a position apart from the current position (P) by the threshold ($\Delta L$) that is a maximum distance ensuring safety, the robot 1 can move to the initial command position (Pc) in a shortest time without greatly impairing workability.

As described above, the threshold (ΔL) can be set considering safety in advance. However, the threshold (ΔL) may be changed so as to have an appropriate value, considering the behavior of the robot 1 performing tasks. As described above, the maximum speed may be a value that is expected to ensure safety. However, in the case of a collaborative robot, which is designed based on the idea of intrinsic safety, safety is assumed to be ensured when the robot 1 is moved at a maximum speed in an automatic mode, i.e. when the robot 1 is moved by position control during a normal operation of reproducing taught operation. Accordingly, when iterating the processing of fine movement by resetting a command position, the threshold (ΔL) may be set based on the maximum speed of the automatic mode.

Control Method for Producing a Speed Pattern

The following description explains a control method for producing a speed pattern. It should be noted that the control method for resetting a command position described above may be considered to be substantially a part of the control method for reproducing a speed pattern.

The controller 2 (CPU 2A) reads information showing a current position (P) and the command (commanded) position (Pc) (FIG. 8, step S20), and determines whether or not there is a position error (deviation), which is equal to or larger than a threshold (ΔL), between the current position (P) and the command position (Pc) (step S21).

If such a position error has occurred between the current position (P) and the command position (Pc) (step S21, YES), the arm of the robot 1 attempts to move to the command position (Pc). In this case, the robot 1 produces a speed pattern (G0) as indicated as the state of automatic mode in FIG. 5. In the speed pattern (G0), a maximum value (Vmax) of allowable moving speed is set as an upper limit (step S22), and the arm of the robot 1 is allowed to move in a shortest time.

In this case, the speed of the arm of the robot 1 rapidly reaches the maximum value (Vmax) of the moving speed, which means that the arm of the robot 1 abruptly moves. The maximum value (Vmax) is not necessarily reached when the arm of the robot 1 moves for quite a short distance. In general, however, the arm of the robot 1 moves in a trapezoidal speed pattern as shown in the state of automatic mode of FIG. 5.

In this regard, if the position error between the current position (P) and the command position (Pc) exceeds the threshold set in advance, the robot 1 produces a new speed pattern (G10) as indicated as the constant speed return in FIG. 5 (as shown in step S22). In the speed pattern (G10), the speed command for moving the robot 1 from the current position (P) to the command position (Pc) has an upper limit (Vhigh) set to not more than the maximum value (Vmax) of the moving speed, and the arm of the robot 1 is allowed to move at a constant speed to the command position (Pc) (steps S23, S24).

Thus, since the upper limit (Vhigh) of the speed command is smaller than the maximum value (Vmax) of the moving speed, the arm of the robot 1 moves at a relatively low speed and will not abruptly change speed from the current position (P). Accordingly, even when a position error has occurred between the current position (P) and the command position (Pc), the arm of the robot 1 is able to move, i.e. return, to the command position (Pc) in a state in which safety is ensured.

Alternatively, the robot 1 may produce a new speed pattern (G11) as indicated as the relief return No. 1 in FIG. 5. The speed pattern (G11) is a mode in which the speed command for moving the arm of the robot 1 from the current position (P) to the command position (Pc) has an upper limit (Vhigh) set to not more than the maximum value (Vmax) of the moving speed, and variation, i.e. relief, is imparted to the moving speed while the arm of the robot 1 moves to the command position (Pc).

Thus, since the upper limit (Vhigh) of the speed command is smaller than the maximum value (Vmax) of the moving speed, the arm of the robot 1 moves at a relatively low speed and will not abruptly change speed from the current position (P). Furthermore, since the speed varies during the movement, the arm of the robot 1 returning to the command position (Pc) can be recognized visually, or recognized tactually if the robot is being subject to direct teaching. Accordingly, the arm of the robot 1 can be moved to the command position (Pc) in a state in which safety is ensured. At the same time, the operator can easily recognize visually or tactually that the robot 1 is not having malfunction.

In this case, the robot 1 may produce a new speed pattern (G12) as indicated as the relief return No. 2 in FIG. 5. The speed pattern (G12) is a mode in which the moving speed is zero or not more than 10%, for example, of the upper limit (Vhigh), and variation of the moving speed is large so that the operator can easily visually keep track of the robot 1. By producing such a speed pattern, the arm of the robot 1 can be moved to the command position (Pc) in a state in which safety is ensured. At the same time, the operator can more reliably recognize that the arm of the robot 1 is returning to the command position (Pc).

Furthermore, the robot 1 may produce a new speed pattern (G13) as indicated as the relief return No. 3 in FIG. 5. The speed pattern (G13) is a mode in which a state of the moving speed being zero or less than 10%, for example, of the upper limit (Vhigh) is continued for a predetermined period. By producing such a speed pattern, the arm of the robot 1 can be moved to the command position (Pc) in a state in which safety is ensured. At the same time, the operator can more reliably recognize that the arm of the robot 1 is returning to the command position (Pc).

The control methods described above can achieve the advantageous effects set forth below.

In a method of controlling the robot 1, a position error is acquired, which indicates a deviation between a command position (Pc) i.e. a control target position, and a current position (P0) i.e. a position where the arm of the robot 1 is currently located. If the acquired position error exceeds a threshold (ΔL) set in advance, a corrected command position (Pn) is set between the current position (P) and the command position (Pc). After the arm of the robot 1 has moved to the corrected command position (Pn), the corrected command position (Pn) is taken to be a new current position (P) to reset a new corrected command position (Pn) between the command position (Pc) and the new current position (P). Such reconfiguration of a corrected command position (Pn) is iterated until the current position (P) becomes equal to the command position (Pc) to thereby move the arm of the robot 1 from the current position (P) to the command position (Pc).

Thus, the distance of movement in one iteration of the reconfiguration becomes small. Consequently, the occurrence of abrupt change of speed command or the like is reduced or prevented and thus abrupt speed change or the like is prevented. Accordingly, even when a position error has occurred between the current position (P) and the command position (Pc), the robot 1 as a collaborative robot that is likely to cause a position error can be moved to the command position (Pc) in a state in which safety is ensured.

Modifications

In another method of controlling the robot 1, by the controller 2 (CPU 2A), a maximum value of arm moving speed considered to ensure safety is calculated in advance as a maximum speed (FIG. 9, step S31), and a threshold (ΔL) is set by multiplying the maximum speed by the update cycle of the command position (Pc) (step S32). Then, a corrected command position (Pn) is set at a position apart from the current position (P) by the threshold (ΔL) (step S33). Thus, the robot 1 can move to the command position (Pc) in a shortest time in a state in which safety is ensured, thereby preventing workability from being greatly impaired. It should be noted that the threshold (ΔL) may be set as a fixed value in advance.

Incidentally, the processes at the steps S31 to S33 belong to the foregoing steps S21 and S22 for explaining the processes in more detail.

In another method of controlling the robot 1, a position error is acquired, which indicates a deviation between a command position (Pc) i.e. a control target position, and a current position (P) i.e. a position where the arm of the robot 1 is currently located. If the acquired position error exceeds a threshold set in advance, a new speed pattern is produced. In the new speed pattern, an upper limit (Vhigh) of the speed command for moving the arm of the robot 1 from the current position (P) to the command position (Pc) is made smaller than the maximum value (Vmax) that is a speed command based on the assumption of moving the arm of the robot 1 from the current position (P) to the command position (Pc) by position control. Based on the newly produced speed pattern, the arm of the robot 1 is moved from the current position (P) to the command position (Pc).

Thus, since the upper limit (Vhigh) of the speed command is smaller than the maximum value (Vmax), the arm of the robot 1 absolutely moves at a relatively low speed, and will not abruptly change speed from the current position (P). Accordingly, even when a position error has occurred between the current position (P) and the command position (Pc), the arm of the robot 1 can move, i.e. return, to the command position (Pc) in a state in which safety is ensured.

In this case, the arm of the robot 1 may be moved with the moving speed varied. Thus, while the arm of the robot 1 can be moved to the command position (Pc) with safety being ensured more reliably, the operator can easily recognize visually or tactually that no malfunction is occurring.

The arm of the robot 1 may be moved by providing a position or a zone where the moving speed is reduced to zero. Thus, while the arm of the robot 1 can be moved to the command position (Pc) with safety being ensured more reliably, the operator can more reliably recognize visually or tactually that no malfunction is occurring. In this case, the moving speed may, for example, be 10% of the upper limit (Vhigh), instead of being reduced to zero, to provide a mode in which moving speed greatly varies and the operator can easily visually keep track of the arm of the robot 1.

The controller 2 may be provided with a reconfiguration section that resets a command position, or a production section that produces a speed pattern, so that a control unit is configured with which a command position is reset or a speed pattern is produced. Such a control unit can also ensure safety if a position error has occurred.

The embodiment set forth above has been described based on a configuration in which the command position (Pc) or the current position (P) is defined as a position in a three-dimensional space, based on the center position of the flange 1g. However, the command position (Pc) or the current position (P) may be defined based on the axis angles of the respective arms. With such a configuration as well, the arm of the robot 1 can be safely returned to the command position (Pc) and safety is ensured in the occurrence of a position error.

Second Embodiment

Referring now to FIGS. 6 and 10, a second embodiment of the present disclosure will be described.

As mentioned above, direct teaching is performed by an operator directly teaching operation positions to the robot 1 by changing the posture thereof. In this case, for example, even if the operator attempts to move the robot's arm along a straight line, such a human manipulation may cause a slight deviation from the straight line. The deviation may occur not only in the horizontal direction but also in the vertical direction.

Therefore, considering the possible occurrence of such a deviation, movement direction in direct teaching may be constrained in advance to a straight line or to the inside of a plane. The plane constraining the movement direction is hereinafter termed a constraint plane. However, a collaborative robot, which cannot generate torque sufficient for resisting against the force of an operator as mentioned above, may be moved away from the constraint plane, if any.

In direct teaching, the robot 1 is moved to a position desired by an operator. Considering this, if a position error has occurred between the current position (P) and the command position (Pc), the robot does not have to be moved to the command position (Pc) because the position error has been deliberately caused by the operator.

In this regard, in the present embodiment, by the controller 2 (the CPU 2A), the direct teaching may be performed by setting a constraint plane (H), such as an X-Y plane shown in FIG. 6, within which a movement direction is constrained. When a position error indicating a deviation between a command position (Pc) and a current position (P) is acquired during such direct teaching (FIG. 10, step S41), and the acquired position error exceeds a threshold set in advance, a projection position (Ps) obtained by projecting the current position (P) onto the constraint plane (H) is reset and output as a new command position (Pc) (steps S42, S43, and S44), and then the arm of the robot 1 is moved from the current position (P) to the reset command position (Pc) (steps S45 and S46).

Specifically, while movement direction should be constrained within the constraint plane (H) during direct teaching, the current position (P) is a position as a result of an operator deliberately moving the robot 1. Therefore, a projection position (Ps), which is a projection of the current position (P) onto the constraint plane (H), is taken to be a target position desired by the operator, and the robot 1 is moved from the current position (P) to the projection position (Ps) i.e. a reset command position (Pc), to achieve movement conforming to the operator's intention.

In this case, as in the first embodiment, the robot 1 may be moved by setting a corrected command position (Pn) between a current position (P) and a projection position (Ps), or may be moved by producing a new speed pattern. Thus, the robot 1 can be moved in a state in which safety is ensured, or in a state in which the operator can visually recognize the robot 1 returning to the constraint plane (H).

What is claimed is:

1. A method of controlling a robot having an arm, comprising:
   acquiring, in an operating space of the robot, at respective update cycles, a position error indicating a deviation between a command position that is a control target position of the arm of the robot and a current position where the aim of the robot is currently located;
   determining, at the respective update cycles, whether the acquired position error exceeds a threshold set in advance;
   when the acquired position error exceeds the threshold, setting, at the respective update cycles, a new corrected command position to which the arm of the robot should be moved, between the current position and the command position in the operating space, the threshold being set based on a maximum possible speed provided to the aim of the robot;
   controlling, at the respective update cycles, the position of the robot based on the new corrected command position;
   after the arm of the robot is moved to the corrected command position, resetting, at the respective update cycles, a new corrected command position between the corrected command position and the command position in the operating space; and
   iterating, at the respective update cycles, the acquiring, determining, setting, controlling and resetting steps until the current position becomes equal to the command position to achieve movement from the current position to the command position.

2. The method of controlling a robot according to claim 1, comprising:
   calculating, at the respective update cycles, a maximum value of a moving speed as the maximum speed, the maximum value being assumed to ensure safety from the aim of the robot, and setting at the update cycles, the threshold by multiplying the maximum speed by the update cycle of the command position; and
   setting, at the respective update cycles, the corrected command position at a position apart from the current position by a distance corresponding to the threshold.

3. The method of controlling a robot according to claim 1, wherein the arm of the robot is moved at a constant speed.

4. The method of controlling a robot according to claim 1, wherein the arm of the robot is moved with a speed being varied.

5. The method of controlling a robot according to claim 1, wherein the arm of the robot is moved by being provided with a position or a zone where a moving speed is reduced to zero.

6. The method of controlling a robot according to claim 2, wherein the arm of the robot is moved at a constant speed.

7. The method of controlling a robot according to claim 2, wherein the arm of the robot is moved with a speed being varied.

8. A method of controlling a robot having an arm, comprising:
   acquiring, in an operating space of the robot, a position error indicating a deviation between a command position that is a control target position and a current position that is a position where the arm of the robot is currently located;
   when the acquired position error exceeds a threshold set in advance, producing a new speed pattern providing a constant upper limit of a speed command for moving the arm of the robot from the current position to the command position. the threshold being set based on a maximum possible speed provided to the arm of the robot, the upper limit being set smaller than a maximum allowable speed provided to the arm of the robot; and
   moving the arm of the robot from the current position to the command position based on the produced new speed pattern.

9. The method of controlling a robot according to claim 8, wherein the new speed pattern is a new trapezoidal speed pattern with the constant upper limit which allows the arm of the robot to move at a constant speed.

10. A method of controlling a robot having an arm, comprising:
    acquiring, in an operating space of the robot, a position error indicating a deviation between a command position that is a control target position and a current position that is a position where the arm of the robot is currently located;
    when the acquired position error exceeds a threshold set in advance and the robot is being subject to direct teaching in which a constraint plane is set to constrain a movement direction of the arm of the robot, resetting a new command position that is a projection of the current position onto the constraint plane; and
    moving the arm of the robot from the current position to the new command position.

11. The method of controlling a robot according to claim 10, wherein the arm of the robot is moved at a constant speed.

12. The method of controlling a robot according to claim 10, wherein the arm of the robot is moved with a speed being varied.

13. An apparatus for controlling a robot having an arm, comprising:
    a sensor sensing an external force applied to the arm of the robot; and
    a controller configured to:
        acquire, in an operating space of the robot, at respective update cycles, a position error indicating a deviation between a command position that is a control target position of the arm of the robot and a current position that is a position where the arm of the robot is currently located, based on the external force;
        determine, at the respective update cycles, whether the acquired position error exceeds a threshold set in advance;
        when the acquired position error exceeds the threshold, set, at the respective update cycles, a new corrected command position to which the arm of the robot should be moved, between the current position and the command position in the operating space, the threshold being set based on a maximum possible speed provided to the aim of the robot;
        control, at the respective update cycles, the position of the robot based on the new corrected command position;
        after the arm of the robot is moved to the corrected command position, reset, at the respective update cycles, a new corrected command position, between the corrected command position and the command position in the operating space; and
        iterate, at the respective control cycles, the acquiring, determining, setting, controlling and resetting processes until the current position becomes equal to the command position to achieve movement from the current position to the command position.

14. An apparatus for controlling a robot having an arm, comprising:
- a sensor sensing an external force applied to the arm of the robot; and
- a controller configured to:
    - acquire, in an operating space of the robot, a position error indicating a deviation between a command position that is a control target position and a current position that is a position where the arm of the robot is currently located, based on the external force;
    - when the acquired position error exceeds a threshold set in advance, produce a new speed pattern providing a constant upper limit of a speed command for moving the arm of the arm of the robot from the current position to the command position, the threshold being set based on a maximum possible speed provided to the arm of the robot, the upper limit being set smaller than a maximum allowable speed provided to the arm of the robot; and
    - move the arm of the robot from the current position to the command position based on the produced new speed pattern.

15. An apparatus for controlling a robot having an arm. comprising:
- a sensor sensing an external force applied to the arm of the robot; and
- a controller configured to:
    - acquire, in an operating space of the robot, a position error indicating a deviation between a command position that is a control target position and a current position that is a position where the arm of the robot is currently located, based on the external force;
    - when the acquired position error exceeds a threshold set in advance and the robot is being subject to direct teaching in which a constraint plane is set to constrain a movement direction of the arm of the robot, reset a new command position that is a projection of the current position onto the constraint plane; and
    - move the arm of the robot from the current position to the new command position.

* * * * *